June 9, 1931.                W. B. WIEGAND                1,809,290
MANUFACTURE OF CARBON BLACK
Filed Jan. 25, 1930
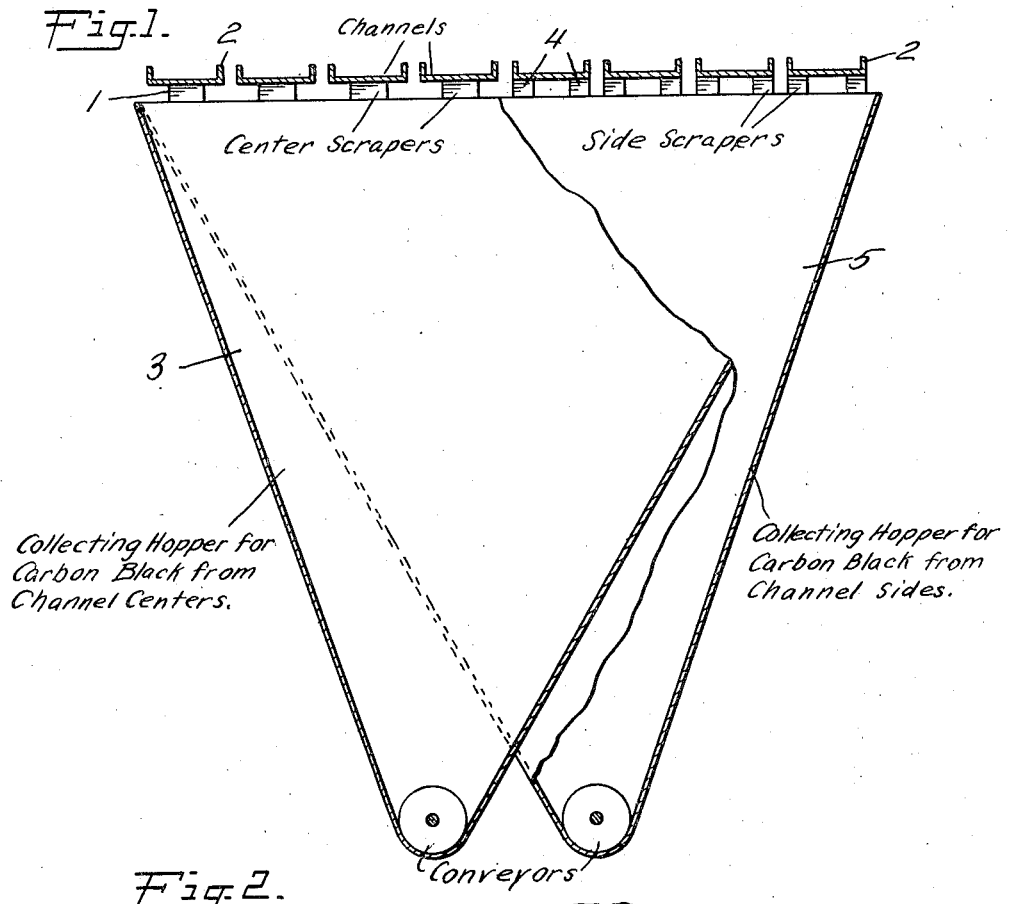
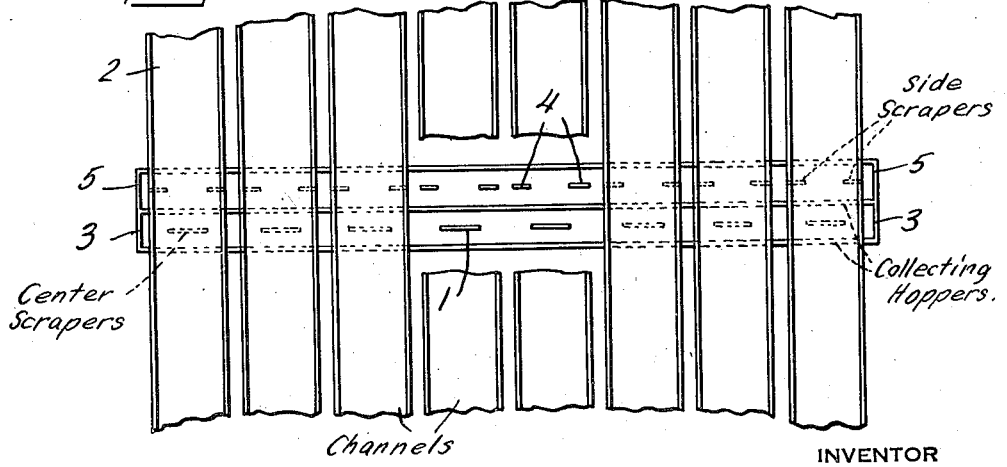
INVENTOR
William B. Wiegand.
BY
Pennie, Davis, Marvin & Edmonds
ATTORNEYS Patented June 9, 1931

1,809,290

UNITED STATES PATENT OFFICE

WILLIAM BRYAN WIEGAND, OF SOUND BEACH, CONNECTICUT

MANUFACTURE OF CARBON BLACK

Application filed January 25, 1930. Serial No. 423,460.

My invention relates to improvements in the manufacture of carbon black by the "channel process." My invention includes particularly a new method and a new apparatus for manufacturing the new carbon black products described in my application filed February 18th, 1929, Serial Number 340,983.

In my prior application just mentioned, I have described new carbon black products of special value in vulcanized rubber. These new carbon black products are characterized by the properties of vulcanized rubber compounds in which they are included and, in themselves, by a greatly reduced absorptive capacity and a low volatile content.

I have now discovered that such new carbon black products can be produced by the well known and widely practiced "channel process," by impingement of a hydrocarbon gas flame burning with the supply of oxygen limited to permit only partial combustion upon the cooler face of a channel positioned to move back and forth across the flame, by selectively and separately collecting the carbon black deposited on the central longitudinal part of the face of the channel and the carbon black deposited on the adjacent outer longitudinal parts of the face of the channel. The carbon black selectively collected from the central longitudinal part of the face of the channel is of low absorptive capacity and of low volatile content and in vulcanized rubber compounds exhibits the improved properties characteristic of the new carbon black products described in my prior application above mentioned. The carbon black selectively collected from the outer longitudinal parts of the face of the channel is of higher absorptive capacity and higher volatile content and in vulcanized rubber compounds exhibits the usual properties of usual carbon black products as distinguished from these new carbon black products. This carbon black selectively collected from the outer longitudinal parts of the face of the channel may, with advantage, be subjected to calcination at a temperature upwards of 1200° F. in a non-oxidizing atmosphere, to reduce its absorptive capacity and its volatile content and to improve the properties of vulcanized rubber compounds in which it is included as described in my prior application above mentioned.

I will illustrate my invention further by reference to the accompanying drawings which represent, diagrammatically and conventionally, apparatus adapted for the practice of the process of my present invention and embodying my present invention. In the accompanying drawings, Fig. 1 is a fragmentary elevation, with parts broken away, of a pair of collecting hoppers showing the channels and scrapers beneath which they are arranged, and Fig. 2 is a fragmentary plan, with parts broken away, of these collecting hoppers showing further relative positions of the scrapers, the channels and the collecting hoppers.

The channels in the apparatus illustrated in the accompanying drawings are the usual channels arranged in the usual way for carrying out the "channel process". As in usual practice, a row of burners is positioned beneath the longitudinal axis of each channel, spaced 4–6 inches apart for example, with the tips of the burners positioned so that a flat flame from each burner normal to the longitudinal axis of the channel impinges upon the channel above the burner. In usual apparatus for carrying out the "channel process", scrapers extending across the entire width of the channels and positioned above the collecting hoppers in which all of the carbon black scraped from the channels is collected together as a common product are positioned at intervals along the length of the channel. In apparatus embodying my invention and for carrying out my invention, however, instead of providing a single group of scrapers delivering into a common collecting hopper I provide two groups of scrapers and two groups of collecting hoppers, one group of scrapers being positioned to scrape deposited carbon black only from the central longitudinal part of the face of the channels and the other group of scrapers being positioned to scrape deposited carbon black from the outer longitudinal parts of the face of the channels, one group of collecting hoppers being positioned to collect the carbon black scraped from the channels by the one group of scrapers and the other group of collecting hoppers being positioned to collect the carbon black scraped from the channels by the other group of scrapers.

Referring more specifically to the accompanying drawings, the scrapers 1 comprise the first group of scrapers and are positioned beneath the central longitudinal part of the face of the channels 2 and above the collecting hopper 3, and the second group of scrapers 4 are positioned beneath the outer longitudinal parts of the face of the channels 2 and above the collecting hopper 5. As the channels are moved back and forth along their longitudinal axis the scrapers 1 selectively scrape the carbon black deposited on the central longitudinal part of the face of the channels therefrom dropping this carbon black in the collecting hopper 3 and the scrapers 4 scrape the carbon black deposited on the outer longitudinal parts of the face of the channel therefrom dropping this carbon black in the collecting hopper 5. With channels 7 inches wide, for example, the scrapers 1 may be 3 inches wide, for example, or with channels 8 inches wide, for example, the scrapers 1 may be 4 inches wide, for example; the scrapers 4 are proportioned to cover that part of the face of the channel not covered by the scrapers 1.

I claim:

1. In the manufacture of carbon black by the "channel process", the improvement which comprises selectively scraping the carbon black deposited on the channels therefrom to collect separately the carbon black deposited on the central longitudinal part of the face of the channels and the carbon black deposited on the adjacent outer longitudinal parts of the face of the channels thereby producing directly a carbon black of relatively low absorptive capacity collected from the central longitudinal part of the face of the channels and a carbon black of higher absorptive capacity collected from the outer longitudinal parts of the face of the channels.

2. In the manufacture of carbon black by the "channel process", the improvement which comprises selectively scraping the carbon black deposited on the channels therefrom to collect separately the carbon black deposited on the central longitudinal part of the face of the channels and the carbon black deposited on the adjacent outer longitudinal parts of the face of the channels thereby producing directly a carbon black of relatively low absorptive capacity collected from the central longitudinal part of the face of the channels and a carbon black of higher absorptive capacity collected from the outer longitudinal parts of the face of the channels and calcining the carbon black collected from the outer longitudinal parts of the face of the channels at a temperature upwards of 1200° F. in a non-oxidizing atmosphere thereby reducing its absorptive capacity.

3. In apparatus for the manufacture of carbon black by the "channel process", an improved arrangement of scrapers and collecting hoppers comprising two groups of scrapers, one group being positioned to scrape deposited carbon black only from the central longitudinal part of the face of the channels and the other group being positioned to scrape deposited carbon black from the outer longitudinal parts of the face of the channels, and separate groups of collecting hoppers, one group being positioned to collect carbon black scraped from the channels by the first-mentioned group of scrapers and the other group being positioned to collect carbon black scraped from the channels by the other group of scrapers.

In testimony whereof I affix my signature.

WILLIAM BRYAN WIEGAND.